(12) United States Patent
Howard

(10) Patent No.: US 9,882,989 B2
(45) Date of Patent: Jan. 30, 2018

(54) SYSTEMS AND METHODS FOR PROVIDING REMOTE ASSISTANCE FOR CONTROLLING A SITE

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 1843 days.

(21) Appl. No.: 11/625,738

(22) Filed: Jan. 22, 2007

(65) Prior Publication Data

US 2008/0177856 A1  Jul. 24, 2008

(51) Int. Cl.
| | |
|---|---|
| *G06F 15/16* | (2006.01) |
| *G06F 15/173* | (2006.01) |
| *H04N 7/16* | (2011.01) |
| *H04L 29/08* | (2006.01) |
| *G06Q 10/06* | (2012.01) |
| *G06Q 50/08* | (2012.01) |
| *G06Q 50/16* | (2012.01) |
| *H04N 21/4227* | (2011.01) |
| *H04L 12/28* | (2006.01) |
| *H04L 12/24* | (2006.01) |
| *H04N 7/15* | (2006.01) |

(52) U.S. Cl.
CPC ........... *H04L 67/125* (2013.01); *G06Q 10/06* (2013.01); *G06Q 50/08* (2013.01); *G06Q 50/16* (2013.01); *H04L 67/02* (2013.01); *H04L 12/2825* (2013.01); *H04L 12/2834* (2013.01); *H04L 12/2898* (2013.01); *H04L 41/0253* (2013.01); *H04L 41/22* (2013.01); *H04L 67/22* (2013.01); *H04L 67/306* (2013.01); *H04N 7/15* (2013.01); *H04N 21/4227* (2013.01)

(58) Field of Classification Search
CPC ... H04L 67/306; H04L 41/22; H04L 12/5061; H04L 12/2825; H04L 12/2834; H04L 12/2898; H04L 41/0253; H04N 21/4227; H04N 7/15
USPC .......................... 709/217, 225, 229; 725/135
See application file for complete search history.

(56) References Cited

U.S. PATENT DOCUMENTS

| | | |
|---|---|---|
| 5,697,834 A | 12/1997 | Heumann et al. |
| 5,801,755 A | 9/1998 | Echerer |
| 6,317,039 B1 | 11/2001 | Thomason |
| 6,898,618 B1 * | 5/2005 | Slaughter ............... G06F 9/465 709/203 |
| 2002/0120718 A1 * | 8/2002 | Lee ............................. 709/219 |
| 2002/0161895 A1 * | 10/2002 | Appiah et al. ................ 709/227 |
| 2003/0065731 A1 * | 4/2003 | Mohammed et al. ........ 709/208 |

(Continued)

OTHER PUBLICATIONS

P. Sylvestre, M. Barbeau and R. St-Denis, "A multimedia on-line assistance system with safe remote control of applications," Proceedings of International Conference on Protocols for Multimedia Systems—Multimedia Networking, Santiago, 1997, pp. 56-61.*

(Continued)

*Primary Examiner* — Taylor Elfervig
(74) *Attorney, Agent, or Firm* — Austin Rapp

(57) ABSTRACT

A method for providing remote assistance for controlling a site is disclosed. A remote assistance request may be received from a control device. The remote assistance request may be sent from the control device to a remote server. Communication between the remote server and the control device may be established.

24 Claims, 14 Drawing Sheets

(56) References Cited

U.S. PATENT DOCUMENTS

| | | |
|---|---|---|
| 2003/0065791 A1* | 4/2003 | Garg ................ H04L 29/12009 709/229 |
| 2003/0149796 A1* | 8/2003 | Emerson et al. ............ 709/250 |
| 2004/0088409 A1* | 5/2004 | Braemer et al. ............ 709/225 |
| 2004/0244056 A1* | 12/2004 | Lorenz ............... H04N 7/17318 725/135 |
| 2005/0044232 A1* | 2/2005 | Keane .................... G06Q 30/06 709/227 |
| 2005/0097159 A1* | 5/2005 | Skidgel ........................ 709/200 |
| 2005/0198245 A1* | 9/2005 | Burgess et al. .............. 709/223 |
| 2005/0228890 A1 | 10/2005 | Lawrence |
| 2006/0120624 A1* | 6/2006 | Jojic et al. .................... 382/284 |
| 2007/0283389 A1* | 12/2007 | Hallberg ............. H04N 5/4403 725/37 |
| 2007/0291109 A1* | 12/2007 | Wang ................ G06F 19/3418 348/14.05 |
| 2008/0088440 A1* | 4/2008 | Palushaj ................. 340/539.25 |

OTHER PUBLICATIONS

E. Rogers, R. R. Murphy, A. Stewart and N. Warsi, "Cooperative assistance for remote robot supervision," 1995 IEEE International Conference on Systems, Man and Cybernetics. Intelligent Systems for the 21st Century, Vancouver, BC, 1995, pp. 4581-4586 vol. 5.*

Hattori et al., "Agent-Based Drivers' Information Assistance System", Feb. 1999, Computer and Network Systems Laboratory Corporate Research and Development Center, Toshiba Corporation, pp. 359-367.*

International Preliminary Report on Patentability issued for International Patent Application No. PCT/US2008/051655 dated Aug. 17, 2009.

* cited by examiner

SYSTEMS AND METHODS FOR PROVIDING REMOTE ASSISTANCE FOR CONTROLLING A SITE

TECHNICAL FIELD

The present invention relates generally to computers and computer-related technology. More specifically, the present invention relates to systems and methods for providing remote assistance for controlling a site.

BACKGROUND

The price of electronic devices has continued to decrease dramatically. In addition, the types of consumer electronic components and home automation electronics that can be purchased have continued to increase. For example, DVD players, large screen TVs, multi-carousel CD and DVD players, MP3 players, video game consoles, and similar consumer electronic items have continued to drop in price and become more widely available. The decreasing prices and increasing types of consumer electronic components has packed today's homes with modern conveniences. But as these conveniences grow in number and sophistication, they also become more difficult to manage and control. In recent years, home automation systems have emerged to help manage and control the myriad devices found in modern homes.

While the home automation market continues to grow each year, past solutions typically addressed customers who build high-end custom homes or do major reconstructions on an existing home. Homeowners have needed a more affordable way to automate their existing homes without the headache and expense of major remodeling. Additionally, homeowners wanted to be able to add new products over time as they are able to afford additional technology. Home automation companies have answered the call by utilizing new wireless technologies that have significantly reduced the costs of installing automated devices in older homes as well as newly constructed homes. The desire for control of devices at a particular location is continuing to expand into retail and other non-home markets.

However, with the affordability of new technology, the number of automated devices in modern homes and other sites has continued to steadily increase. Property owners now desire more customizable systems and features in their automation systems. With more customizations and features, property owners may desire the ability to receive remote assistance for controlling their site.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
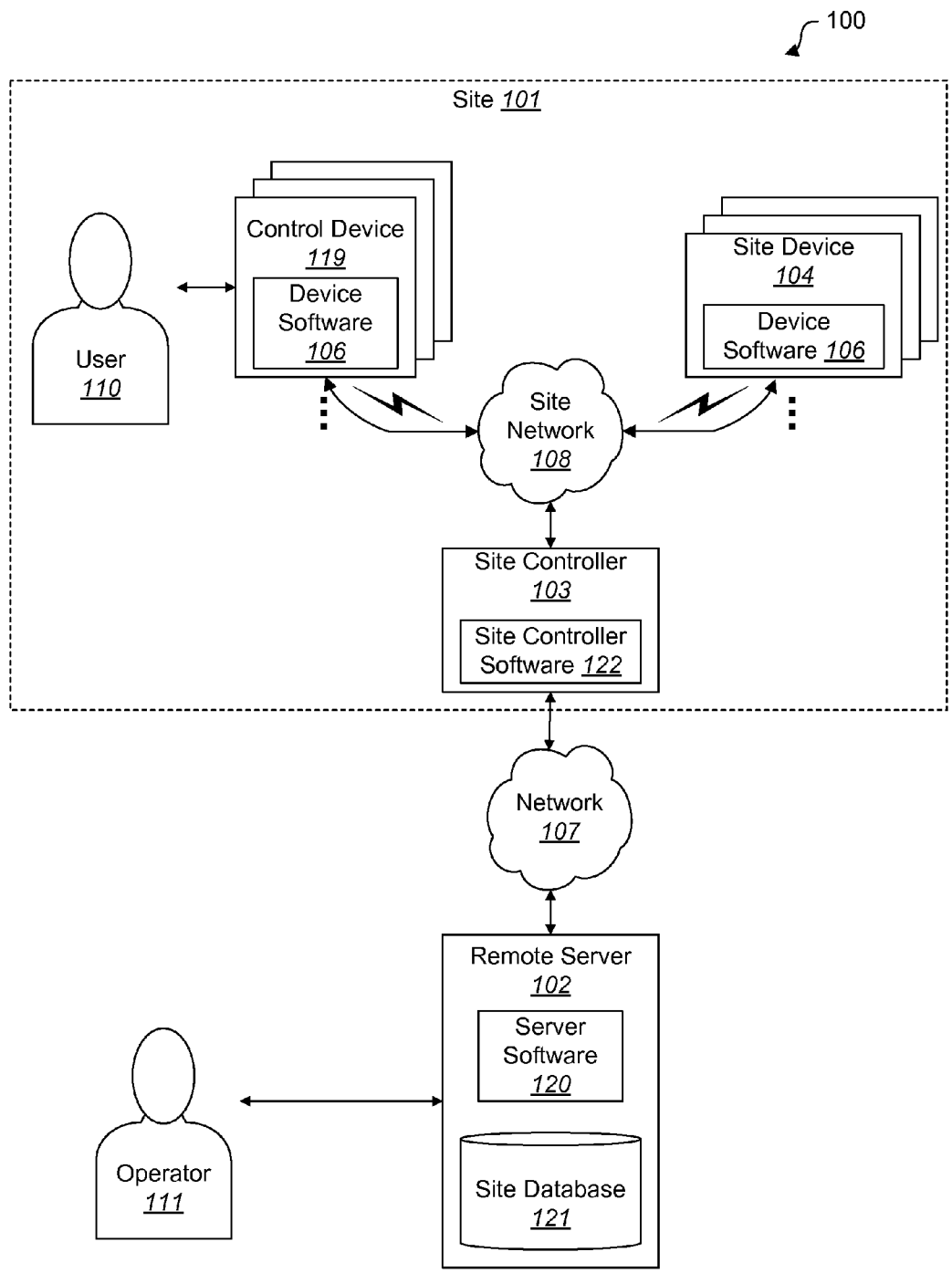
FIG. 1 is a block diagram illustrating a system for providing remote assistance for controlling a site.

A method for providing remote assistance for controlling a site is described. A remote assistance request is received from a control device. The remote assistance request is sent from the control device to a remote server. Communication is established between the remote server and the control device.

A computer system that is configured for providing remote assistance for controlling a site is described. The system includes a control device. The control device is in electronic communication with a site controller. The system includes a site controller. The site controller includes a processor. The site controller includes memory in electronic communication with the processor. The site controller includes instructions stored in the memory. The instructions are executable to receive a remote assistance request from the control device. The instructions are executable to send the remote assistance request from the control device to a remote server. The instructions are executable to establish communication between the remote server and the control device.

A computer-readable medium comprising executable instructions for implementing a method for providing remote assistance for controlling a site is described. The site includes a site controller and a control device. The control device is in electronic communication with the site controller. The site controller is in electronic communication with a remote server. The instructions are executable to receive a remote assistance request from the control device. The instructions are executable to send the remote assistance request from the control device to the remote server. The instructions are executable to establish communication between the remote server and the control device.

In some embodiments, the capabilities of the site are determined. In further embodiments, connections are established between the communication device and the remote server. In still further embodiments, information is sent in response to the remote assistance request.

In some embodiments, the information includes video. In further embodiments, the information includes audio. In still further embodiments, the information includes textual information.

In some embodiments, whether the remote server should remotely control the site is determined. In other embodiments, the site is remotely controlled. In further embodiments, remote control of the site is relinquished.

In some embodiments, configuration data is read from the site. In further embodiments, configuration data about the site is read from a database. In still further embodiments, history information from the control device is sent to a remote server. In some embodiments, the configuration data includes device information relating to a plurality of devices.

In some embodiments, the site includes a communication device. The communication device is in electronic communication with a site controller. In further embodiments, connections are established between the communication device and the remote server.

In some embodiments, commands are relayed from the remote server to the site. In further embodiments, the commands are relayed to an electronic device to cause a change on the electronic device.

In some embodiments, the site controller does not require a keyboard or a mouse for standard operation. In other embodiments, the site controller comprises an embedded system that includes built-in audio ports, built-in video ports, and built-in infrared in and out ports and wherein the site controller does not require an external exclusive computer monitor for standard operation.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating a system 100 for providing remote assistance for controlling a site 101. The system 100 may include a site 101, a network 107, a remote server 102, and an operator 111.

The site 101 may include a site controller 103. The site controller 103 may include site controller software 122. The site controller software 122 may be used to control the site devices 104 in the site 101 and/or to allow remote access to the site 101. The site 101 may include a user 110. The user 110 may use a control device 119 to request remote assistance for controlling the site 101.

The site 101 may include multiple site devices 104 and multiple control devices 119. The site devices 104 and control devices 119 may include device software 106. The device software 106 may interact with the site controller software 122 to control the function of the various site devices 104. For the purposes of this disclosure, site devices 104 may include control devices 119. In the present embodiment, the control devices 119 may differ from the other site devices 104 because the control devices 119 may be used for providing remote assistance for controlling the site 101. In some embodiments the site devices 104 may have a connection to a network outside of the control of the site controller 103. In other embodiments the site devices 104 may not have a connection to a network outside of the control of the site controller 103. For example, in the present embodiment, the site devices 104 may not be in direct electronic communication with the network 107; rather, the site devices 104 may connect to the network 107 through the site controller 103 via a site network 108.

The site controller 103 may be in electronic communication with the site devices 104. The site devices 104 may communicate with the site controller 103 over the site network 108. The site network 108 may be a wired or wireless network. For example, the site devices 104 may communicate with the site controller 103 via an infrared (IR) connection, an Ethernet connection, a wireless connection using the 802.11g (WiFi) standard, a wireless connection using the 802.15.4 (ZigBee) standard, or other wired or wireless connections.

The remote server 102 may be in electronic communication with the site 101 via the network 107. In the present embodiment, the site controller 103 is in electronic communication with the remote server 102 via the network 107. The remote server 102 may include server software 120 and a site database 121. An operator 111 may use the remote server 102 to provide remote assistance for controlling the site 101. The server software 120 may be used to facilitate communication between the site controller 103 and the remote server 102.

Figure 2:
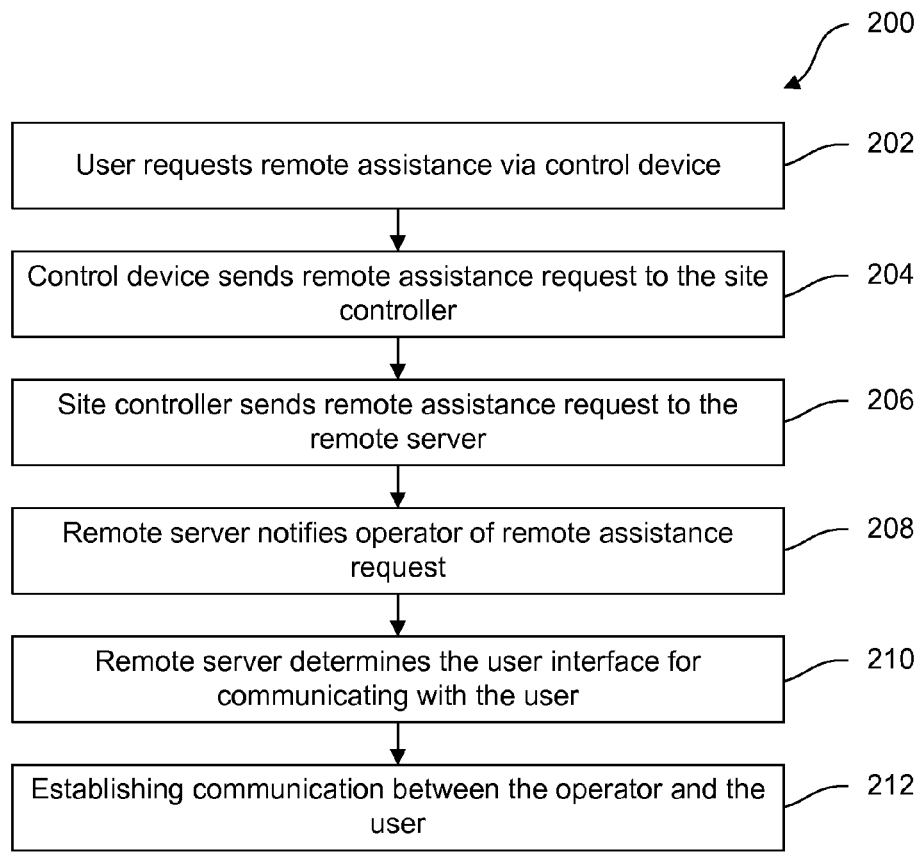
FIG. 2 is a flow diagram of an embodiment of a method for providing remote assistance for controlling a site.

FIG. 2 is a flow diagram of an embodiment of a method 200 for providing remote assistance for controlling a site 101. The method 200 may include a user 110 requesting 202 remote assistance using a control device 119. The user 110 may request 202 remote assistance using the control device 119 by selecting an input that indicates a request for remote assistance. For example, the user 110 may press a remote assistance button or a combination of buttons, give a voice command, touch the screen, or the like.

The control device 119 may send 204 a remote assistance request to the site controller 103. The control device 119 may send 204 the remote assistance request using an IR connection, an Ethernet connection, a WiFi connection, a ZigBee connection, or another type of communication. The site controller 103 may receive the remote assistance request. The site controller 103 may send 206 the remote assistance request to the remote server 102. The remote assistance request may be sent 206 by the site controller 103 using the network 107. The network 107 may include any wired or wireless connection, such as the connections discussed herein or any other connection.

The remote server 102 may receive the remote assistance request from the site controller 103. The remote server 102 may notify 208 the operator 111 of the received remote assistance request. For example, the remote server 102 may notify 208 the operator 111 of the received remote assistance request by using the server software 120 to open a window in a user interface on the remote sever 102. In another example, the remote server 102 may notify 208 the operator 111 of the received remote assistance request by generating an audio notification. Notifying 208 the operator 111 of the received remote assistance request may be performed using any notification process.

The remote server 102 may determine 210 a user interface for communicating with the user 110. The user 110 may have pre-selected a preferred user interface. The user interface may include communicating via a telephone, via a video connection through the site controller 103, via an audio connection through the site controller 103, via a text based connection through the site controller 103, or any other user interface or combination of user interfaces. The preferred user interface may be based on the capabilities of the site devices 104 and site controller 103 at the particular site 101. For example, the site devices 104 and site controller 103 may only be capable of using an audio user interface rather than a video user interface or a telephone user interface rather than a text based user interface.

Communication between the operator 111 and the user 110 may be established 212. In the present embodiment, the remote server 102 may establish communication with the site controller 103 to facilitate communication between the operator 111 and the user 110. In other embodiments, for example if the site 101 is only capable of telephone communications, the operator 111 may call the telephone number of the site 101 to communicate with the user 110.

Figure 3:
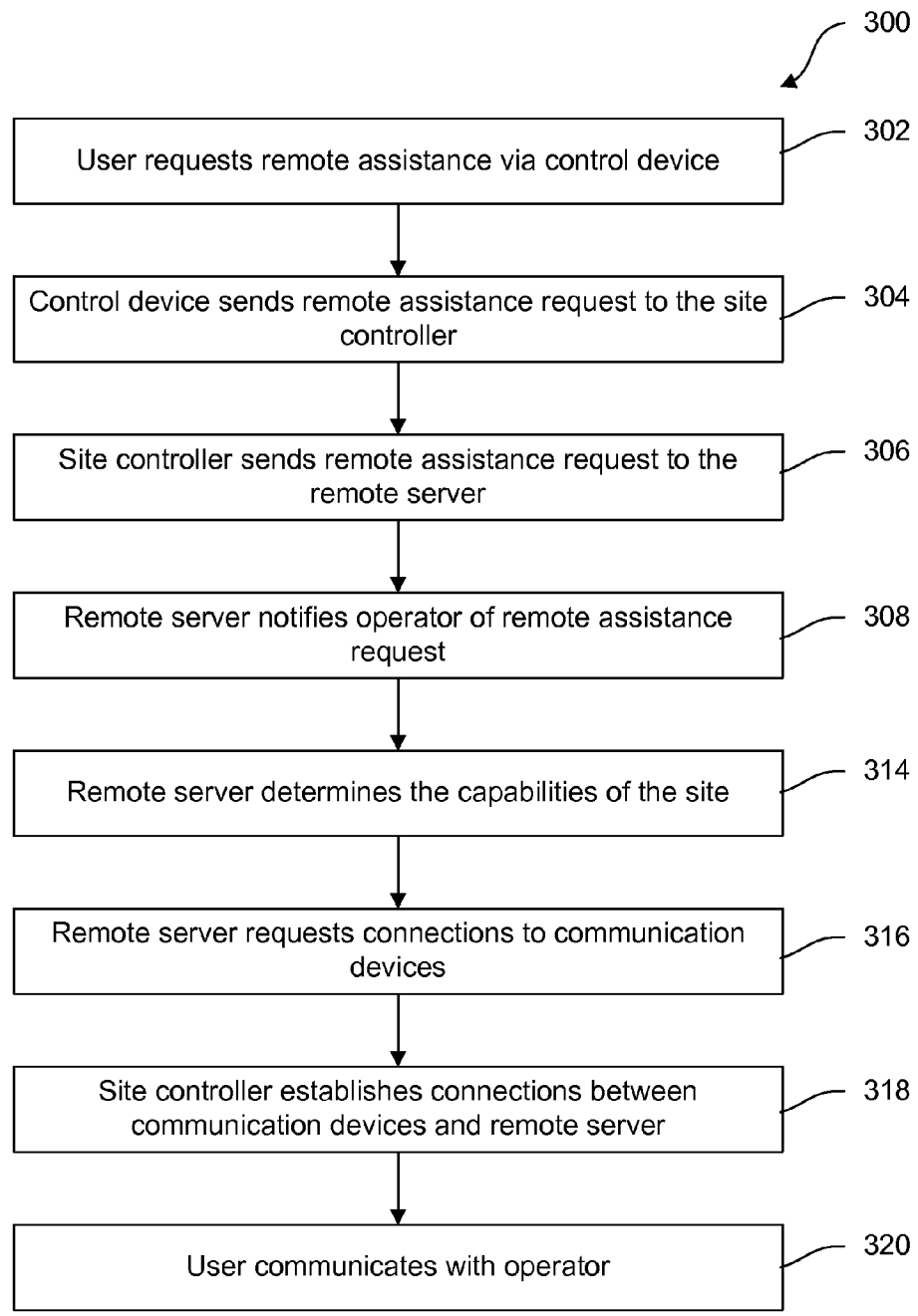
FIG. 3 is a flow diagram of an embodiment of a method for providing remote assistance for controlling a site.

FIG. 3 is a flow diagram of an embodiment of a method 300 for providing remote assistance for controlling a site 101. The method 300 may include a user 110 requesting 302 remote assistance using a control device 119. The control device 119 may send 304 a remote assistance request to the site controller 103. The site controller may send 306 the remote assistance request to the remote server 102. The remote server 102 may notify 308 the operator 111 of the received remote assistance request.

The remote server 102 may determine 314 the capabilities of the site 101. For example, the remote server 102 may determine 314 the capabilities of the site devices 104 and the site controller 103 at the site 101. The capabilities of the site devices 104 and the site controller 103 may include whether the site devices 104 and the site controller 103 are capable of communications such as, video, audio, text, or other communication. The capabilities of the site devices 104 and the site controller 103 may include whether the site devices 104 and the site controller 103 are capable of one-way or two-way communication. For example, a site 101 may include communications devices that may be in electronic communication with the site devices 104 and/or the site controller 103.

In one example, the site 101 may include communications devices such as a television monitor with speakers, a web camera, and a microphone. In this first example, the site 101 may be capable of two-way audio/video communication. The site 101 may be capable of two-way audio/video communication because the site 101 may be able to display video (via the television) and generate audio (via the speakers) from the remote server 102 and may be able to record video (via the webcam) and audio (via the microphone) to send (via the site controller 103) to the remote server 102.

In a second example, the site 101 may include communications devices such as speakers and a microphone. In this second example, the site 101 may only be capable of two-way audio communication because the site 101 may only be able to record (via the microphone) and send (via the site controller 103) audio to the remote server 102 and to generate (via the speakers) audio from the remote server 102.

In a third example, the site 101 may include communications devices such as a television and a control device 119. In this third example, the site 101 may only be capable of two-way text communication because the site 101 may only be able to display (via the television or the control device 119) and send (via the control device 119) text to and from the remote server 102. However, the site 101 in this third example may be able to receive one-way video (via the television) and/or text (via the television) communication from the remote server 102.

In a fourth example, the site 101 may include communications devices such as a television with speakers and a control device 119. In the fourth example, the site 101 may only be capable sending text communication because the site 101 may only be able to send (via the control device 119) text to the remote server 102. However, the site 101 in this fourth example may be able to receive one-way audio (via the speakers), video (via the television), and/or text (via the television) communication from the remote server 102.

A site 101 may include any combination of the foregoing examples of site capabilities. Additionally, a site 101 may have additional capabilities beyond one-way and/or two-way audio, video, and/or text communication capabilities.

The remote server 102 may request 316 connections to the communications devices. The remote server 102 may request 316 connections to the communications devices by sending a request for a connection to the site controller 103. The site controller 103 may establish 318 connections between the remote server 102 and the communications devices. The connections may be established 318 by the site controller 103 directly or indirectly through other site devices 104. The user 110 may communicate 320 with the operator 111. The user 110 may communicate 320 with the operator 111 via the established 318 connections. The connections may allow the user 110 and the operator 111 to communicate using a user interface. The control device 119 may send information to the remote server 102. For example, the control device 119 may send information from the site database 121.

Figure 4:
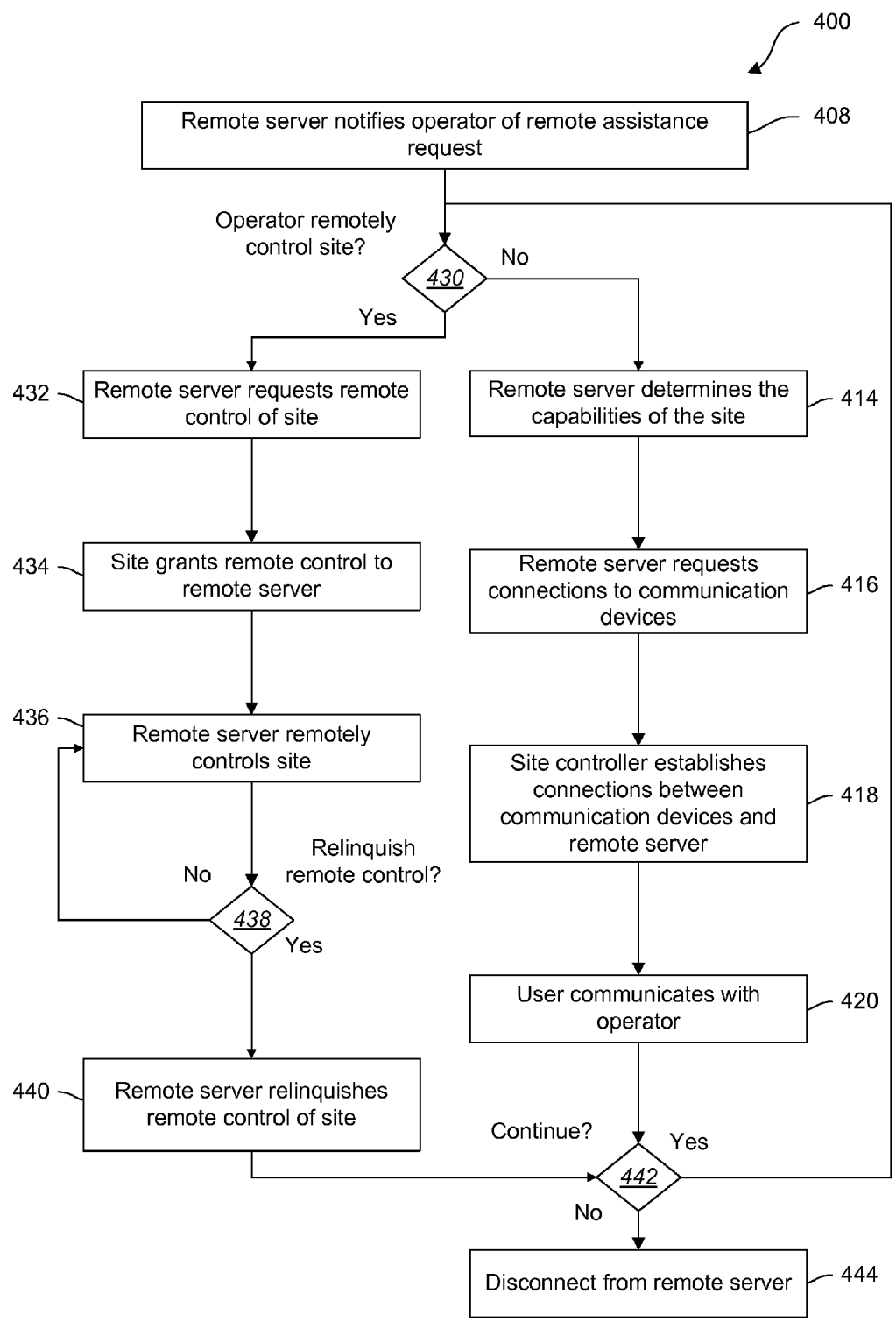
FIG. 4 is a flow diagram of an embodiment of a method for providing remote assistance for controlling a site.

FIG. 4 is a flow diagram of an embodiment of a method 400 for providing remote assistance for controlling a site 101. The method may include a remote server 102 notifying 408 an operator 111 of a remote assistance request. Whether the operator 111 should remotely control a site 101 may be determined 430. Determining 430 whether the operator 111 should remotely control the site 101 may be made by the operator 111. The operator 111 may consider, based on the skill of the user 110 and the complexity of the issue, for example, that the issue may be most easily resolved by taking remote control of the site 101.

If it is determined 430 that the operator 111 should remotely control the site 101, the remote server 102 may request 432 remote control of the site 101. For example, the remote server 102 may send a request 432 for remote control to the site controller 103. The site 101 may grant 434 remote control to the remote server 102. For example, the site controller 103 may allow the remote server 102 to remotely control the software and hardware on the site controller 103. Granting 434 remote control to the remote server 102 may include all site devices 104 granting remote control to the remote server 102. For example, the site devices 104 may allow the remote server 102 to remotely control the software and hardware on the site devices 104.

The remote server 102 may remotely control 436 the site 101. Remotely controlling 436 the site 101 may include remotely configuring the site 101, remotely updating the software on the site 101, remotely testing the site devices 104, relaying commands from the remote server 102 to the site 101, relaying commands from the remote server 102 to an electronic device to cause a change on the electronic device, and/or remotely performing any other function typically performed by the user 110, the site controller 103, and/or the site devices 104 at the site 101.

Whether the operator 111 should relinquish remote control of the site 101 may be determined 438. Determining 438 whether the operator 111 should relinquish remote control of the site 101 may be made by the operator 111. For example, the operator 111 may consider, based on the skill of the user 110 and the complexity of the issue, that the issue may be more easily resolved by relinquishing remote control of the site 101. In another example, the operator 111 may consider whether the user 110 has gained sufficient understanding of the site 101 based on watching the operator 111 remotely control 436 the site 101 and may determine 438 that the user 110 is capable of resolving any remaining issues.

If it is determined 438 that the operator 111 should relinquish remote control of the site 101, the remote server 102 may relinquish 440 remote control of the site 101. Relinquishing 440 remote control may include, for example, giving control of the software and hardware on the site controller 103 back to the site controller 103. Relinquishing 440 remote control of the site 101 may include giving control to the site devices 104. For example, the remote server 102 may give the site devices 104 control of the software and hardware on the site devices 104.

If it is determined 430 that the operator 111 should not remotely control the site 101, the remote server 102 may determine 414 the capabilities of the site 101. For example, the remote server 102 may determine 414 the capabilities of the site devices 104 and the site controller 103 at the site 101. The remote server 102 may request 416 connections to the communications devices. The remote server 102 may request 416 connections to the communications devices by sending a request for a connection to the site controller 103. The site controller 103 may establish 418 connections between the remote server 102 and the communications devices.

The user 110 may communicate 420 with the operator 111. The user 110 may communicate 420 with the operator 111 via the established 418 connections. The connections may allow the user 110 and the operator 111 to communicate 420 using a user interface. For example, the user 110 may communicate 420 with the operator 111 using one-way and/or two-way audio, video, text communication and/or other user interfaces.

Whether the remote session should continue may be determined 442. The operator 111 may determine 442 whether the remote session should continue. If it is determined 442 that the remote session should end, the site 101 may be disconnected 444 from the remote server 102. For example, if all of the issues for which the user 110 requested help from the operator 111 have been resolved, the operator 111 may determine 442 that the site 101 should be disconnected 444 from the remote server 102. If it is determined 442 that the remote session should continue, the operator 111 may determine 430 whether the operator 111 should take control of the site 101.

Figure 5:
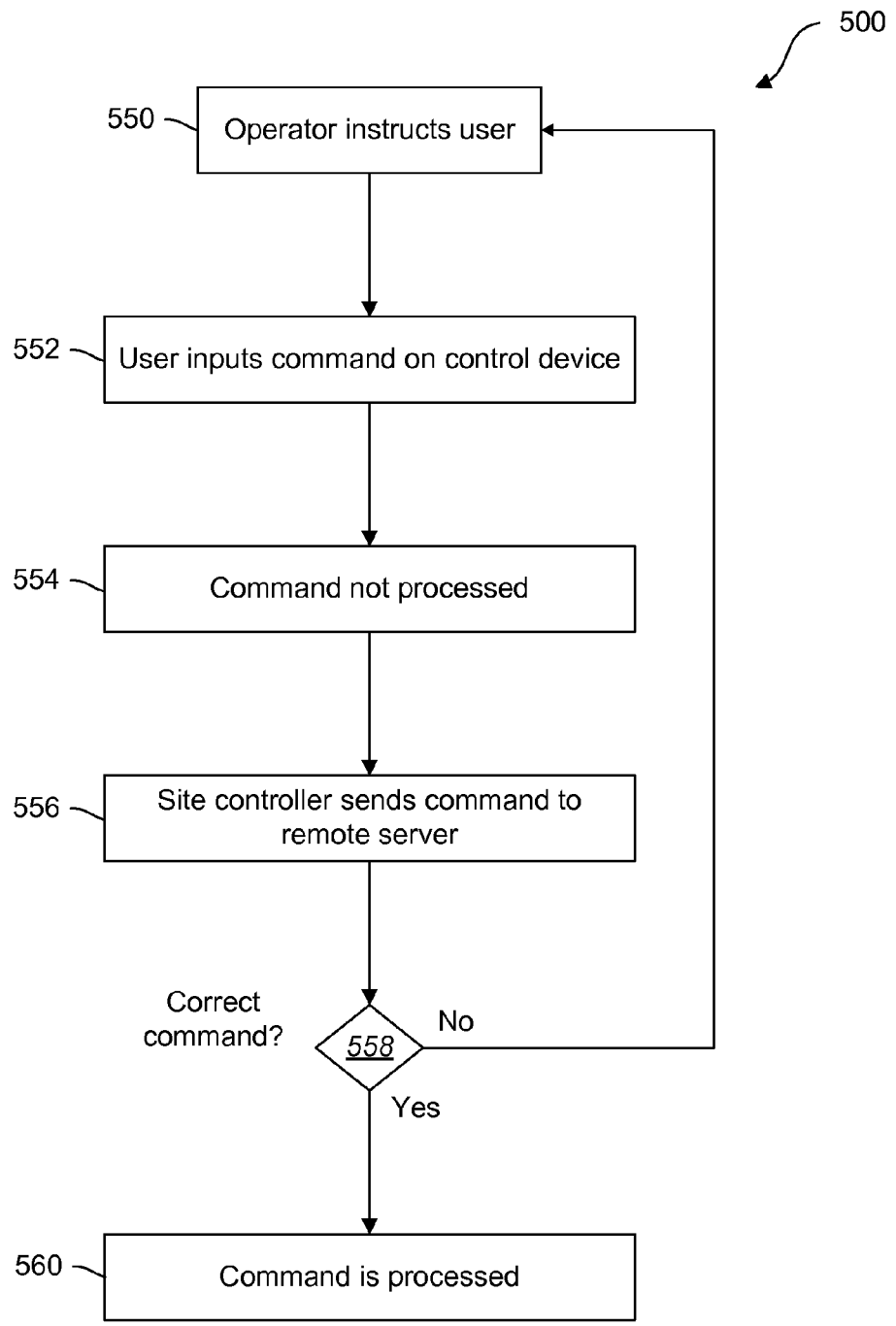
FIG. 5 is a flow diagram of an embodiment of a method for providing remote assistance for controlling a site.

FIG. 5 is a flow diagram of an embodiment of a method 500 for providing remote assistance for controlling a site 101. The method 500 may include an operator 111 instructing 550 a user 110. For example, the user 110 may request help with programming a digital video recorder (DVR). The operator 111 may instruct 550 the user 110 to press an activity selection button, such as a DVR button. The user 110 may input 552 a command on a control device 119. For example, the user 110 may input 552 a correct command, i.e. press the DVR button, or may input 552 an incorrect command, i.e. press a video cassette recorder (VCR) activity selection button.

The command may not be processed 554. For example, the control device 119 may not process 554 the command. In another example, the control device 119 may not send the command to the site controller 103. In a further example, the control device 119 may send the command to the site controller 103, though the site controller 103 may not process 554 the command. Processing 554 the command may include performing the tasks or actions associated with the command. For example, if the command is to turn on a desired site device 104 that is connected to the site controller 103, processing 554 the command may include turning on the desired site device 104.

The site controller 103 may send 556 the unprocessed command to the remote server 102. The site controller 103 may send 556 the unprocessed command to the remote server 102 via the network 107. For example, the site controller 103 may send 556 information that indicates a request to process a command was made, but that the command was not processed.

A determination 558 may be made whether the command was correct. For example, if the operator 111 instructed 550 the user 110 to press the DVR button and the user 110 pressed the DVR button, the command may be correct. If the operator, for example, instructed 550 the user 110 to press the DVR button and the user 110 pressed the VCR button, the command may not be correct.

The determination 558 may be made by the operator 111, the remote server 102, the site controller 103, and/or the control device 119. In one example, if the operator 111 makes the determination 558, the control device 119 may send the command (via the site controller 103) to the remote server 102, which may indicate the command to the operator 111. The operator 111 may examine the command and determine 558 whether it was correct.

In another example, if the remote server 102 makes the determination 558, the operator 111 may indicate the correct command to the remote server 102. When the control device 119 sends the command (via the site controller 103) to the remote server 102, the remote server 102 may compare the command indicated by the operator 111 with the command sent from the control device 119. If the commands are the same, the remote server 102 may determine 558 that the command was correct.

In a further example, if the site controller 103 makes the determination 558, the operator 111 may indicate the correct command to the remote server 102, which may send the correct command to the site controller 103. The control device 119 may send the command to the site controller 103. The site controller 103 may compare the command sent from the remote server 102 with the command sent from the control device 119. If the commands are the same, the site controller 103 may determine 558 that the command was correct.

In a still further example, if the control device 119 makes the determination 558, the operator 111 may indicate the correct command to the remote server 102, which may send the correct command to the control device 119 (via the site controller 103). The control device 119 may compare the command sent from the remote server 102 with the command input by the user 110. If the commands are the same, the control device 119 may determine 558 that the command was correct.

If it is determined 558 that the input command was correct, the command may be processed 560. For example, if it is determined 558 that the input command was correct, the control device 119 may process 560 the command. If it is determined 558 that the input command was not correct, the operator 111 may begin the method 500 again by instructing 550 the user 110.

Figure 6:
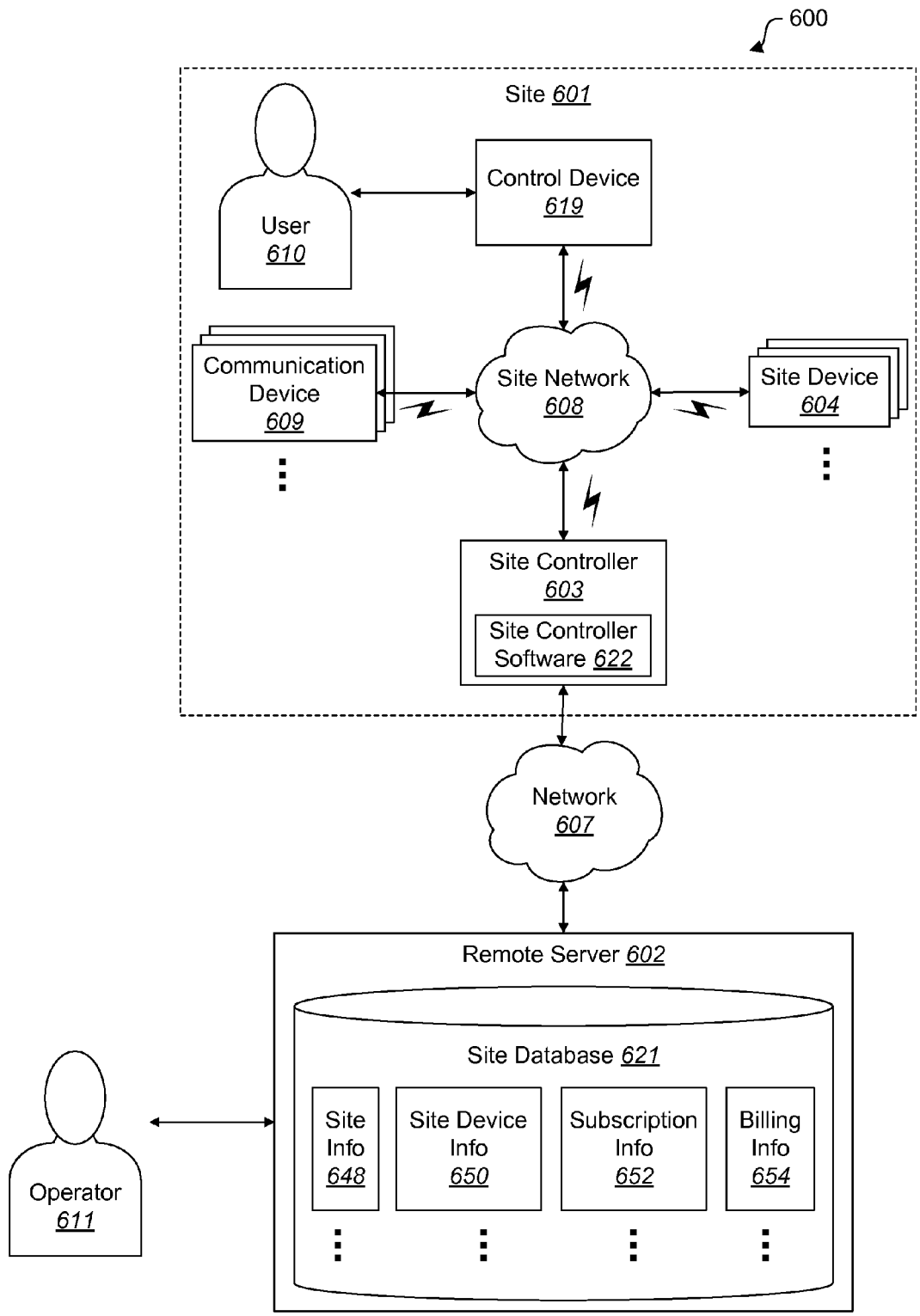
FIG. 6 is a block diagram illustrating a system for providing remote assistance for controlling a site.

FIG. 6 is a block diagram illustrating a system 600 for providing remote assistance for controlling a site 601. The system 600 may include a site 601, a network 607, a remote server 602, and an operator 611.

The site 601 may include a site controller 603. The site controller 603 may include site controller software 622. The site controller software 622 may be used to control the site devices 604 in the site 601 and/or to allow remote access to the site 601.

The site 601 may include multiple site devices 604, multiple control devices 619, and multiple communication devices 609. The site controller 603 may be in electronic communication with the site devices 604, control devices 619, and communication devices 609 via a site network 608.

The communication devices 609 may be in direct electronic communication with the site controller 603 or may be in indirect electronic communication, such as through a site device 604. The communication devices 609 may be integrated into a site device 604. Communication devices 609 may include devices that are capable of facilitating various types of communication. For example, communications devices 609 may include video displays, text displays, audio generation devices, video recording devices, text input devices, audio recording devices, and the like. Control devices 619, site devices 604, and/or site controllers 603 may include communications devices 609. For example, a control device 119 may include communication devices 609 such as an audio recording device (i.e. a microphone) and/or an audio generation device (i.e. a speaker).

The site 601 may include a user 610. The user 610 may use a control device 619 to request 202 remote assistance for controlling the site 601. For example, the user 610 may request 202 remote assistance using the control device 619 by selecting an input that indicates a request for remote assistance. The user 610 may use the control device 619 to control the site devices 604 in the site 601.

The remote server 602 may be in electronic communication with the site 601 via the network 607. In the present embodiment, the site controller 603 is in electronic communication with the remote server 602 via the network 607. The remote server 602 may include a site database 621. An operator 610 may use the remote server 602 to provide remote assistance for controlling the site 601.

The site database 621 may include site information 648, site device information 650, subscription information 652, and billing information 654. The information stored in the site database 621 may be obtained from the site 601. For example, the site 601 may include a database of site information. In some embodiments, the database may be stored on the control device 619.

The site information 648 may include information about the site 601. For example, the site information 648 may include a preferred user interface, prior support history, history information, various site zones, contact information for the site, the location of the site, and/or other information regarding the site 601. The contact information may include the site telephone number, name of the user, and/or other contact and user information.

Site device information 650 may include the types of site devices 604 at the site 601. The site device information 650 may include identifications, capabilities, locations, software versions, configuration data, and other information for each site device 604. The subscription information 652 may include information regarding a subscription for the site 601. For example, the user 610 may have a subscription for remote assistance to control a site 601. The subscription information 652 may include the duration of the subscription, the type of subscription, or other subscription information 652.

The billing information 654 may include information used to bill a user 610 for a subscription for remote assistance to control a site 601. For example, billing information 654 may include credit card information for the user 610, payment history for the user 610, or other billing information.

Figure 7:
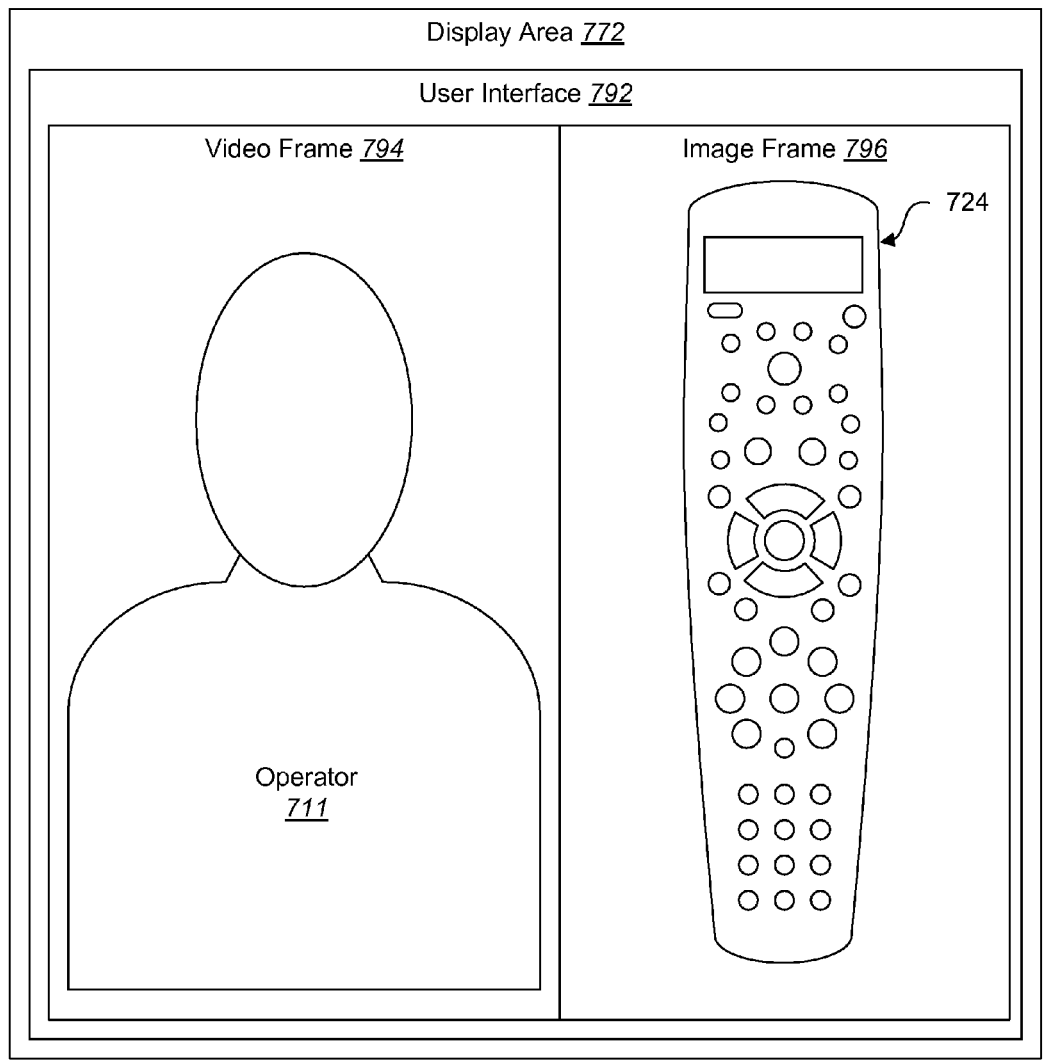
FIG. 7 is a block diagram illustrating an embodiment of a user interface in which the present systems and methods may be implemented.

FIG. 7 is a block diagram illustrating an embodiment of a user interface 792 in which the present systems and methods may be implemented. In the present embodiment, the user interface 792 is an audio/video user interface. A display area 772 may be used to display the video portion of the audio/video user interface. The user interface 792 may include a video frame 794 and an image frame 796. The video frame 794 may display a video image of the operator 711. The image frame 796 may display still images. In the present embodiment, the image frame 796 may display a site remote control 724. For example, the video frame 794 of the user interface 792 may display the operator 711 and the image frame 796 may display a site remote control 724 with a button highlighted. The operator 711 may instruct a user 110 to press the highlighted button on the site remote control 724 displayed in the image frame 796.

The user interface 792, of the present embodiment, may use multiple video frames 794, image frames 796, and/or other frames to display information to remotely assist the user 110 in controlling the site 101. Other user interfaces 792 may also be used. For example, if a site 101 is not capable of video communication, but is capable of text communication, the user interface 792 may display text instructions from the operator 711 on the display area 772.

Figure 8:
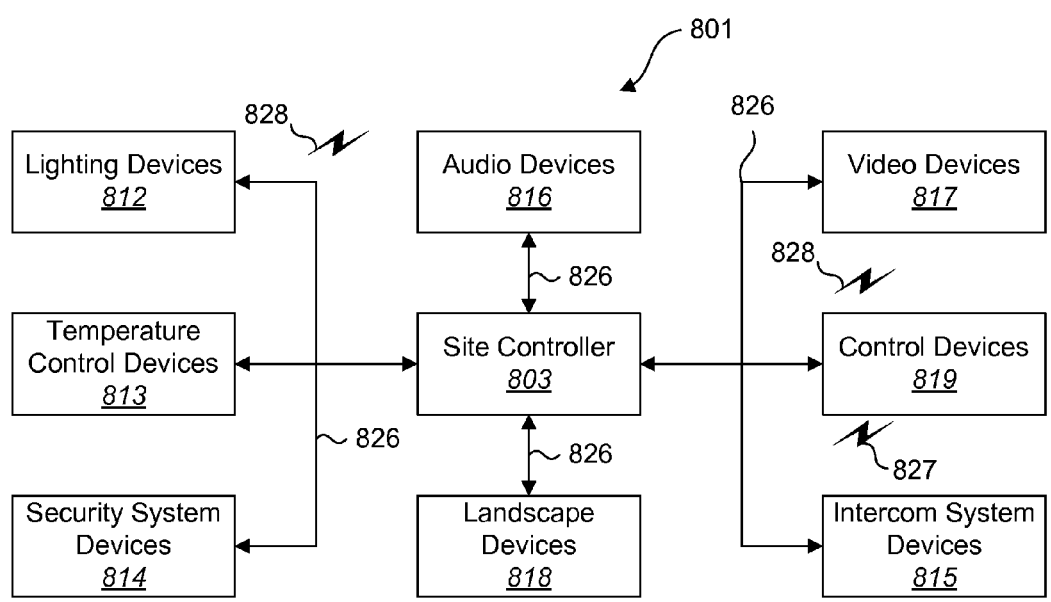
FIG. 8 is a block diagram illustrating an embodiment of a site in which the present systems and methods may be implemented.

FIG. 8 is a block diagram illustrating an embodiment of a site 801 in which the present systems and methods may be implemented. The site 801, in the present embodiment, includes a site controller 803 and other site devices 104. The site controller 803 may be in electronic communication with the site devices 104. A site 801 may include multiple site controllers 103, but typically requires that one of the site controllers 103 is designated as the primary site controller 803.

The site controller 803 may be connected to the site devices 104 via wireless or wired connections. In the present embodiment, the site controller 803 may be connected to the site devices via an Ethernet connection 826, a WiFi connection 827, a ZigBee connection 828, or a combination of the three. The site controller 803 may be capable of communicating via these network connections, i.e. Ethernet, WiFi, or ZigBee connections 826, 827, 828 or other connections.

The site devices 104, in the present embodiment, may include lighting devices 812, temperature control devices 813, security system devices 814, intercom system devices 815, audio devices 816, video devices 817, landscape devices 818, and control devices 819. Lighting devices 812 may include light switches, dimmers, window blinds, etc. Temperature control devices 813 may include thermostats, fans, fireplaces, and the like. Security system devices 814 may include security cameras, motion detectors, door sensors, window sensors, gates, or other security devices. Intercom system devices 815 may include intercom microphones, intercom related video devices, and other devices typically associated with an intercom system. Audio devices 816 may include AM/FM radio receivers, XM radio receivers, CD players, MP3 players, cassette tape players, and other site devices 104 capable of producing an audio signal. Video devices 817 may include televisions, monitors, projectors, and other site devices 104 capable of producing a video signal. Landscape devices 818 may include sprinkler system devices, drip system devices, and other landscape related devices. The control devices 819 may include touch screens, keypads, and remote controls. For example, control devices 819 may include site remote controls, LCD keypads, mini touch screens, or other control devices 819 capable of controlling a site controller 103.

Figure 9:
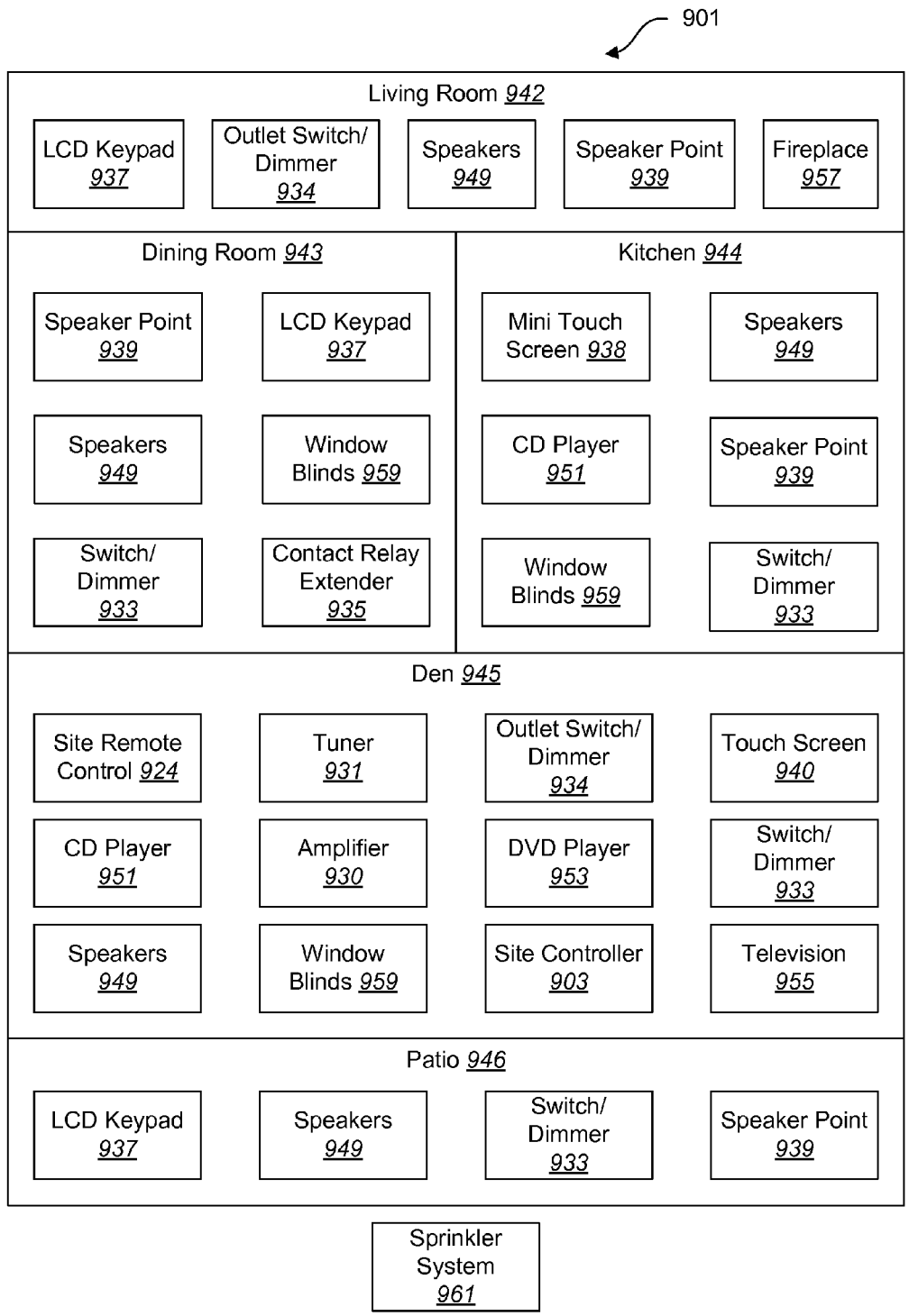
FIG. 9 is a block diagram illustrating an exemplary audio/visual home automation site in which the present systems and methods may be implemented.

FIG. 9 is a block diagram illustrating an exemplary audio/visual home automation site 901 in which the present systems and methods may be implemented. The audio/visual home automation site 901 may include various areas, such as a living room 942, dining room 943, kitchen 944, den 945, and a patio 946. Though the present embodiment illustrates a home automation site 901, other sites 101 may also implement the present systems and methods. For example, the present systems and methods may be implemented in an office building, warehouse, or other site 101. A site 101 may not be limited to a particular building or space. Rather, a site 101 may include a site controller 103 and various site devices 104 in electronic communication with the site controller 103. A home, for example, may include more than one site 101. In some embodiments, multiple site controllers 103 may be used within the same site, though one site controller 103 is typically designated as the primary site controller 903.

Additional site devices 104, other than the site devices 104 shown in FIG. 9, such as security system devices 814, intercom system devices 815, temperature control devices 813, etc., may also be used in the present embodiment of a site 901. However, for ease of presentation, only lighting devices 812, audio devices 816, video devices 817, landscape devices 818, and control devices 119 are shown in FIG. 9. In the present embodiment, the audio devices 816 include amplifiers 930, tuners 931, speakers 949, speaker points 939, and CD players 951. The video devices 817, in the present embodiment, may include DVD players 953 and televisions 955. In the present embodiment, control devices 119 may include site remote controls 924, LCD keypads 937, mini touch screens 938, or other control devices 119. In the present embodiment, the lighting devices 812 may include switch/dimmers 933, outlet switch/dimmers 934, fireplaces 957, and window blinds 959. The landscape devices 818, in the present embodiment, may include a sprinkler system 961. Other audio devices 816 and video devices 817 may be used in the present systems and methods, such as MP3 players, digital video recorders, satellite boxes, cable boxes, video game systems, and the like. Other lighting devices 812 and landscape devices 818 may also be used with the present systems and methods.

The site controller 903, in the present embodiment of a site 901, may be located in the den 945. The site controller 903 may be in electronic communication with various site devices 104 over the site network 108. In the present embodiment, some site devices 104, such as audio switches, amplifiers, and tuners may be connected to the site controller 803 via Ethernet connections 826. Site remote controls 924 may be connected to the site controller 803 via ZigBee connections 828. Switch/dimmers 933, outlet switch/dimmers 934, multiple button keypads (not shown), and LCD keypads 937 may be connected to the site controller 803 via Ethernet connections 826 and ZigBee connections 828. Mini touch screens 938 and contact relay extenders 935 may be connected to the site controller 903 via an Ethernet connection 826, a ZigBee connection 828, and a WiFi connection 827. Speaker points 939 may be connected to the site controller 803 via an Ethernet connection 826 and a WiFi connection 827. Touch screens 940 may be connected to the site controller 803 via a ZigBee connection 828 and a WiFi connection 827.

In the present embodiment, the den 945 may include the site controller 903, a switch/dimmer 933, an outlet switch/dimmer 934, a CD player 951, a DVD player 953, an amplifier 930, a tuner 931, a television 955, speakers 949, and window blinds 959. The speakers 949 in the den 945 may be connected directly to the site controller 903. A site remote control 924 and a touch screen 940 may also be located in the den 945.

In the present embodiment, speakers 949 that are not directly connected to the site controller 903, such as the speakers 949 in the living room 942, dining room 943, and kitchen 944 and the speakers 949 on the patio 946, may be connected to one of the speaker points 939. The speaker points 939 may allow the speakers 949 not directly connected to the site controller 903 to be controlled by the site controller 903. For example, the site controller 903 may transmit audio signals to the speakers 949 via the speaker points 939. The audio signals, in the present embodiment, may be transmitted to the speaker points 939 over an Ethernet connection 826 or a WiFi connection 827. However, any connection capable of the bandwidth necessary to transmit audio signals may be used. Similar connections may be used for transmitting video signals over a site 901.

The site remote control 924 and touch screen 940 in the den 945, the LCD keypads 937 located in the living room 942, dining room 943, and on the patio 946, and the mini touch screen 938 located in the kitchen 944 may be used to control all of the site devices 104 in the site 901 that are connected to the site controller 903. For example, the LCD keypad 937 in the living room 942 may control the CD player 951 in the den 945 to play music over the speakers 949 in the living room 942 via the speaker point 939 in the living room 942. The LCD keypad 937 in the living room 942 may also, for example, control the CD player 951 in the den 945 to play music over all speakers 949 in the site 901 via their respective speaker points 939 or a direct connection to the site controller 903.

Typically devices like the window blinds 959, the fireplace 957, or the sprinkler system 961 may not be capable of communication using an Ethernet, WiFi, or ZigBee connection 826, 827, 828. In order to control such devices, the contacts, relays, or other connections that control their function may be connected to a site device 104 that is capable of communication with a site controller 103.

For example, the window blinds 959 in the dining room 943 may be connected to a contact relay extender 935. The contact relay extender 935 may then communicate with the site controller 903 using an Ethernet connection 826, a WiFi connection 827, or a ZigBee connection 828. The site controller 903 may then be programmed to raise, lower, or adjust the blinds 959. If a user wanted to lower the blinds 959 in the dining room 943, the user may use the LCD keypad 937 to send a signal to the site controller 903, which would send a signal to the contact relay extender 935, which would then send a signal to the servo of the window blinds 959 to lower the blinds. The sprinkler system 961 may be connected to the site controller 903 in a similar fashion.

Figure 10:
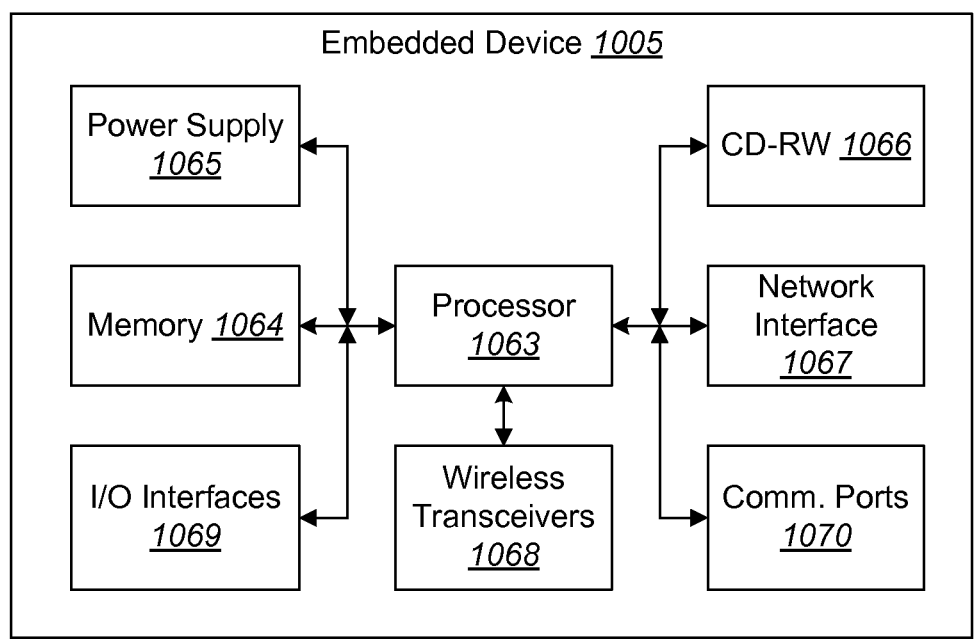
FIG. 10 is a block diagram illustrating various hardware components that may be used in an embodiment of an embedded device that may be found in the site.

FIG. 10 is a block diagram illustrating various hardware components that may be used in an embodiment of an embedded device 1005 that may be found in the site 101. The site controller 103, site devices 104, and control devices 119 may be embedded devices 1005.

The embedded device 1005 may include a processor 1063 that is in electronic communication with memory 1064. The memory 1064 may include volatile and/or non-volatile memory. The embedded device 1005 may include a power supply 1065. The embedded device 1005 may include a CD-RW drive 1066. In other embodiments, the CD-RW drive 1066 may not be a writeable drive, but may only be a CD-ROM drive. In still other embodiments, the CD-RW drive 1066 may be a DVD-RW or a DVD-ROM drive. The CD-RW drive 1066 may also be a Blu-ray disk or a HD DVD drive. The embedded device 1005 may be capable of using the CD-RW drive 1066 to rip audio or video data from CDs and DVDs.

The embedded device 1005 may include a network interface 1067 that allows the embedded device 1005 to connect using wired connections, such as Ethernet connections 826. The network interface 1067 may use various protocols to enable the embedded device 1005 to interface with any wired network. The embedded device 1005 may include wireless transceivers 1068. In the present embodiment, the embedded device 1005 may include a WiFi transceiver and a ZigBee transceiver. The embedded device 1005 may include any type of wireless transceiver 1068. For example, the wireless transceiver 1068 may allow the embedded device 1005 to transmit and receive data using any wireless protocol, such as WiFi, ZigBee, Bluetooth, Ultra Wideband, Wimax, and/or cellular protocols, such as GSM or EVDO.

The embedded device 1005 may include I/O interfaces 1069. For example, the I/O interfaces 1069 may include inputs and/or outputs such as buttons, selection dials, serial ports, contact ports, relay ports, IR windows, IR ports, video sense loop ports, audio ports, and video ports. The embedded device 1005 may include communication ports 1070. The communication ports 1070 may include USB ports, firewire ports, or other ports for communicating with other devices.

Some site controllers 103 and site devices 104 may not include all of the illustrated components. Other site controllers 103 and site devices 104 may include additional components. For example, many site devices 104 may not include a CD-RW drive 1066.

Figure 11:
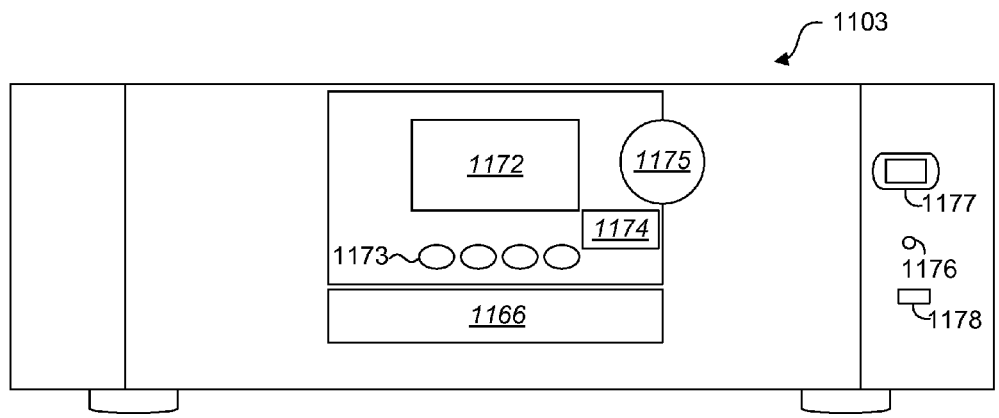
FIG. 11 is a front view of a block diagram illustrating the various features available on an exemplary site controller.

FIG. 11 is a front view of a block diagram illustrating the various features available on an exemplary site controller 1103. Specifically, FIG. 11 shows the front of an exemplary site controller 1103.

The site controller 1103 may include a display area 1172. The display area 1172 in the present embodiment may be used to display settings, playlist sections, title sections, media information, receiver status, and system menus. The site controller 1103 may also include various buttons 1173 for selecting options displayed in the display area 1172.

The site controller 1103 may also include an IR in window 1174. The IR in window 1174 may be used to receive IR codes from the site remote control 324 or from any other device capable of sending IR signals, including other remote controls (not shown) used to control devices that are not capable of communication with the site controller 1103. The site controller 1103 may include a selection dial 1175. The selection dial 1175 may be used to scroll through menus and media lists displayed in the display area 1172.

In the present embodiment, the site controller 1103 may include a reset button 1176. The reset button 1176 may be used to refresh the site controller software 122. The site controller 1103 may also include a WiFi antenna 1177. The WiFi antenna 1177 may be used with an extender (not shown) to improve reception of wireless signals. A ZigBee antenna (not shown) may also be used to extend the range of a wireless transceiver 1068 using a ZigBee connection 828.

The site controller 1103 may also include a CD-RW drive 1166. As discussed above, the CD-RW drive 1166 may be replaced with any drive that is capable of playing CD or DVD related media. The CD-RW drive 1166 may be used to import CD or DVD data into the memory 1064 of the site controller 1103. The site controller 1103 may also include a USB port 1178. The USB port 1178 may be used to import data from USB enabled devices.

Figure 12:
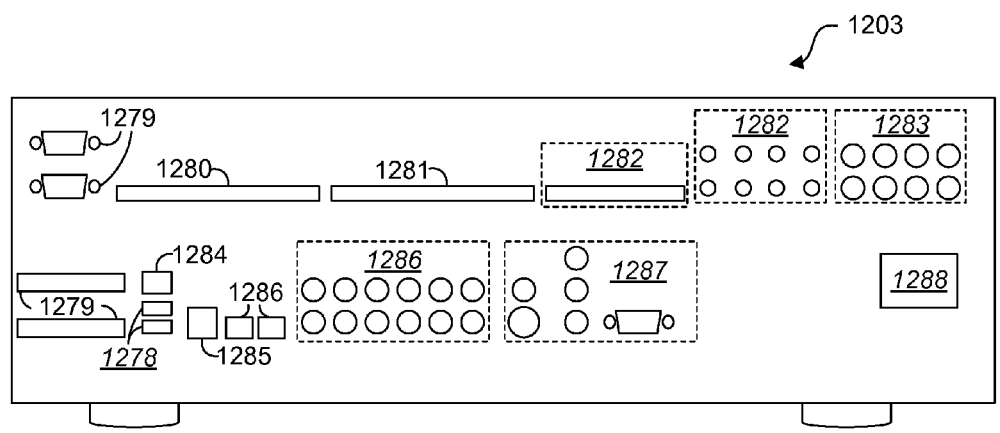
FIG. 12 is a rear view of a block diagram illustrating the various features available on an exemplary site controller.

FIG. 12 is a rear view of a block diagram illustrating the various features available on an exemplary site controller 1203. Specifically, FIG. 12 shows the back of an exemplary site controller 1203. Most connectors and ports are typically found on the back of the site controller 1203 leaving the front more aesthetically pleasing. However, the location of the various connectors and ports is typically not functionally important.

The site controller 1203 may include serial ports 1279. The serial ports 1279 may include standard serial ports and configurable serial ports. The standard serial ports may be used for RS-232 or other I/O devices, which include hardware flow control. In the present embodiment, the site controller 1203 may include two standard serial ports. The configurable serial ports may be used for RS-232, RS-422, or RS-485 devices or for other serial I/O devices. In the present embodiment, the site controller 1203 may include two configurable serial ports.

The site controller 1203 may include contact ports 1280. The contact ports 1280 may include a pluggable terminal block connector that may be used for dry contact closure, or logic input connections, such as door switches or motion sensors. In the present embodiment, the site controller 1203 may include six contact ports 1280. The site controller 1203 may include relay ports 1281. The relay ports 1281 may include a pluggable terminal block connector that may be used for normally closed or normally opened switchable connections, such as blinds, fireplace, or projector screens. In the present embodiment, the site controller 1203 may include six relay ports 1281.

The site controller 1203 may include IR ports 1282. The IR ports 1282 may include IR in ports and IR out ports. The IR in ports may include a pluggable terminal block connector that may be used for handheld IR devices, such as device specific remote controls (not shown). In the present embodiment, the site controller 1203 may include four IR in ports. The IR out ports may include 3.5 mm earphone jacks. The IR out ports may be used for IR sticky emitters that can be placed over IR readers on media players, TVs, or other targets to transmit an IR signal from site controller 1203 to the target. In the present embodiment, the site controller 1203 may include eight IR out ports. The site controller 1203 may include video sense loop in/out ports 1283. The video sense loop in/out ports 1283 may be composite ports for video sources, such as DVD players or VCRs, which allow the site controller 1203 to detect the On/Off status of devices that use the same IR code for both on and off commands. The site controller 1203, in the present embodiment, may include four pairs of video sense loop in/out ports 1283 (four in and four out).

The site controller 1203 may include an Ethernet connector 1284 for establishing an Ethernet connection 826 with the site devices 104 in a site 101. The Ethernet connector 1284 may be connected to the network interface 1067 on the site controller 1203. The Ethernet connector 1284 may be an RJ-45 for a 10/100 BaseT Ethernet connector. In the present embodiment, the site controller 1203 may include an additional USB port 1278 on the back of the site controller 1203. A modem port 1285 may be included with the site controller 1203. The modem port 1285 may be an RJ-11 port for a modem to support caller ID or a voice menu system.

The site controller 1203 may also include audio in/out ports 1286. The audio in ports may be RCA jacks for stereo channel input for stereo analog sources. In the present embodiment, the site controller may include three audio in ports. The audio out ports may be RCA jacks for stereo channel output. In the present embodiment, the site controller 1203 may include three audio out ports. The audio in/out ports 1286 may include digital audio in/out ports. The digital audio in/out ports may be designed for a Toslink™ optical cable for digital audio in/out, like MP3 players, CD players, DVD players, etc.

The site controller 1203 may include various video ports 1287. The video ports 1287 may be in/out ports and may include composite video ports, S-Video ports, component video ports, and/or VGA ports. The video ports 1287 may be used to display navigation menus on a monitor or TV. In the present embodiment, the video ports 1287 include a composite video out port, an S-Video out port, a component video out port, and a VGA out port. A power plug port 1288 may be included in the site controller 1203.

The site controller 1203 is different than a personal computer for a number of reasons. The site controller 1203 is an embedded system that is specialized for the functions and purposes set forth herein. The site controller 1203 generally does not include a keyboard or mouse for standard operation. Unlike a personal computer, the site controller 1203 may not contain an expandable motherboard. For example, the site controller 1203 may not include expandable memory slots or expandable ports, such as a PCI, AGP, or PCI Express card slot. Unlike a personal computer, the site controller 1203 may also not have an exclusive computer monitor. For example, typically a personal computer may include a relatively large monitor or display that is primarily for viewing an operating system user interface and executed programs. The site controller 1203 may merely use a television or monitor for brief periods of time, although the television or monitor may primarily be used for viewing television programming, DVDs, etc. In another example, the site controller 1203 may be used without a separate monitor; the site controller 1203 may use the display area 1272. Typically, a personal computer with such a small display area would be incapable of the multiple interfaces and ports that may be found on a site controller 1203. The site controller 1203 may also not have the capability to install and run third party software, such as word processing software. The site controller 1203 typically does not allow a user to install and run third party software on the controller 1203. Unlike a personal computer, a typical user generally could not install a different operating system on the site controller 1203.

Figure 13:
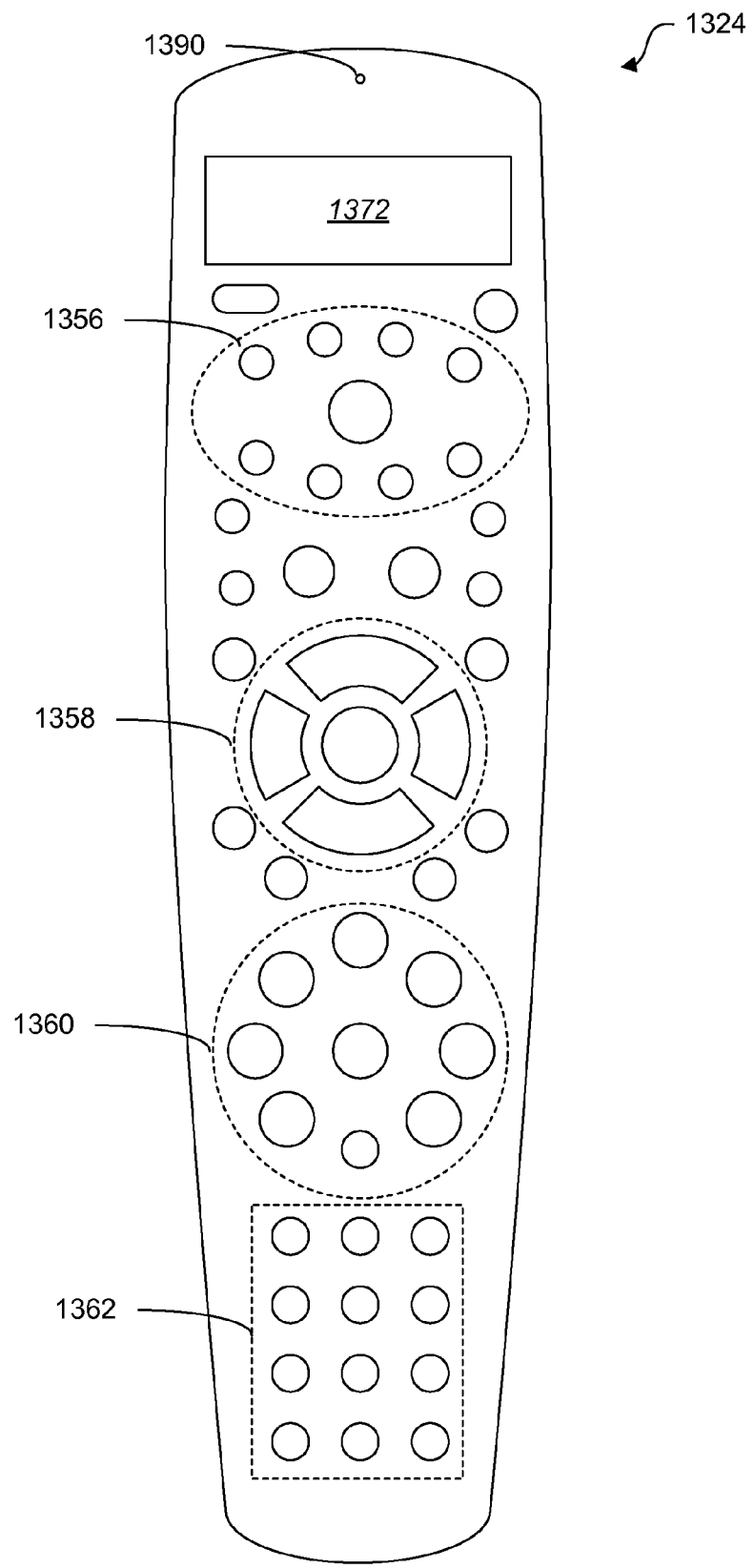
FIG. 13 is a block diagram illustrating the various features available on an exemplary site remote control.

FIG. 13 is a block diagram illustrating the various features available on an exemplary site remote control 1324. The site remote control 1324 may include a display area 1372. The display area 1372 may be a backlit LCD screen. In some embodiments, the display area 1372 may be a simple LCD screen such that the LCD screen has limited capacity to display information. The display area 1372 may be used for video, text, or other connections with the remote server 102.

The site remote control 1324 may include a microphone 1390, an audio in port 1286, or the like. In the present embodiment, the site remote control 1324 may not include a speaker 949. In other embodiments, the site remote control 1324 may include a speaker 949, audio out port 1286, or the like. The microphone 1390 and/or a speaker 949 may be used for audio connections with the remote server 102.

The site remote control 1324 may include various I/O interfaces 869. The I/O interfaces 869 may include buttons or controls for user input. For example, the site remote control 1324 may include activity selection buttons 1356, navigation controls 1358, device control inputs 1360, input controls 1362, or other I/O interfaces 869. The activity selection buttons 1356 may allow the user to select which devices to control. For example, the activity selection buttons 1356 may include buttons that allow the user to control televisions, video recording/playback devices, temperature control devices, lighting devices, security devices, audio recording/playback devices, or other devices. The activity selection buttons 1356 may include a remote assistance request button (not shown) that, when pressed, may start send 204 a remote assistance request to the site controller 103.

The navigation controls 1358 may include navigation buttons that allow a user to navigate through user interfaces 792. For example, navigation buttons may allow the user to select various options presented by the display area 1372.

The device control inputs 1360 may include device control buttons. The device control inputs 1360 may allow a user to perform functions that were previously performed by the device specific remote control. For example, the device control inputs 1360 may include device control buttons such as play, stop, pause, fast-forward, rewind, record, etc. that would typically be found on a DVD or VCR device specific remote control.

The input controls 1362 may include numeric, alphanumeric, or other arrangements of input buttons. The input controls 1362 may allow a user to input alphanumeric characters. For example, in the present embodiment, the input controls 1362 may be numeric buttons such as the numbers 0-9 that may also be used to input text using various systems, such as Multi-Tap or T9, iTap, LetterWise, or other predictive text technology. The input controls 1362 may include a qwerty keyboard, thumbboard, or other layout. The input controls 1362 may be used to facilitate text communication with the remote server 102.

The site remote control 1324 may include a wireless transceiver 868. The wireless transceiver 868 may be used to send wireless signals over the site network 108. In the present embodiment, the wireless transceiver 868 may be used to send data over a ZigBee connection 828.

The site remote control 1324 may be used to facilitate one-way and/or two-way audio, video, text, and/or other communication. For example, the display area 1372 may be used for video, text, or other connections with the remote server 102. The microphone 1390 may be used to communicate via an audio connection with a remote server 102. The navigation controls 1358 may allow a user to navigate through user interfaces 792. For example, the navigation buttons may allow the user to select various options presented by a user interface 792 in the display area 772.

Figure 14:
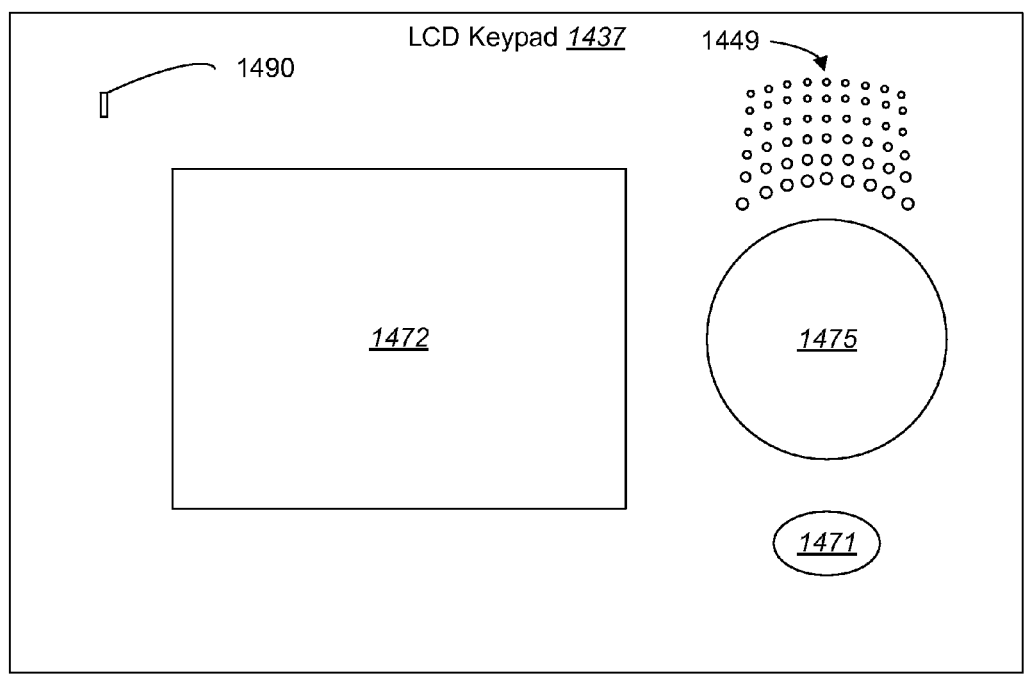
FIG. 14 is a block diagram illustrating the various features available on an exemplary LCD keypad.

FIG. 14 is a block diagram illustrating the various features available on an exemplary LCD keypad 1437. The front of an embodiment of an LCD keypad 1437 is illustrated. The present embodiment may be incorporated into a wall mounted, a table top, or other configuration.

The LCD keypad 1437 may include I/O interfaces 869. In the present embodiment, the I/O interfaces 869 may include a display area 1472 and input controls 1362, such as a selection dial 1475 and/or a shortcut button 1471. The display area 1472 may include a color LCD screen. In the other embodiments, the display area 1472 may be a TFT or other touch screen. In embodiments where the display area 1472 is a touch screen, the display area 1472 may act as an input control 1362, such that it may be used to input data by touching the screen. No stylus may be required, though a stylus may be used.

The selection dial 1475 may be used to identify the LCD keypad 1437 to the site controller 103. For example, when the LCD keypad 1437 is installed, the installer may press the selection dial 1475 to send a message to the site controller 103 indicating that the LCD keypad 1437 is connected to the site network 108. The selection dial 1475 may be used to scroll through user interfaces displayed in the display area 1472. For example, a user interface may present various options for selection in a circular menu, i.e. the selection dial 1475 may be used to cycle through the selections as the selection dial 1475 is rotated. The user may make a selection by pressing the selection dial 1475. In other embodiments, the LCD keypad 1437 may include navigation controls 1358. The navigation controls 1358 may include navigation buttons.

The LCD keypad 1437 may include a microphone 1490. The microphone 1490 may be used for intercom functions such as communicating over an intercom, recording audio, processing voice commands, monitoring a room, or other functions.

The LCD keypad 1037 may include a speaker 1049. The speaker 1049 may be used for intercom functions, such as communicating over an intercom. The speaker 1049 may be used to generate audio reports or other speaker functions.

The LCD keypad 1037 may include audio in ports (not shown). The audio in ports may be used to connect an audio device to the LCD keypad 1037 to provide audio output through the speakers 1049 on the LCD keypad 1037. In other embodiments, the audio in/out ports 1086 may include a 3.5 mm earphone jack and a microphone jack. The LCD keypad 1037 may include an Ethernet connector (not shown) for establishing an Ethernet connection 826 with the site controller 103. The LCD keypad 1037 may include a wireless transceiver 868. The wireless transceiver 868 may be used to send wireless signals over the site network 108. In the present embodiment, the wireless transceiver 868 may be used to send data over a ZigBee connection 828.

The LCD keypad 1437 may be used to facilitate one-way and/or two-way audio, video, text, and/or other communication. For example, the display area 1472 may be used for video, text, or other connections with the remote server 102. The microphone 1490 may be used to communicate via an audio connection with a remote server 102. The speaker 1049 may be used to communicate via an audio connection with a remote server 102. The selection dial 1475 may be used for text or other connections with the remote server 102. The navigation controls 1358 may allow a user to navigate through user interfaces 792. For example, the navigation buttons may allow the user to select various options presented by a user interface 792 in the display area 772.

Figure 15:
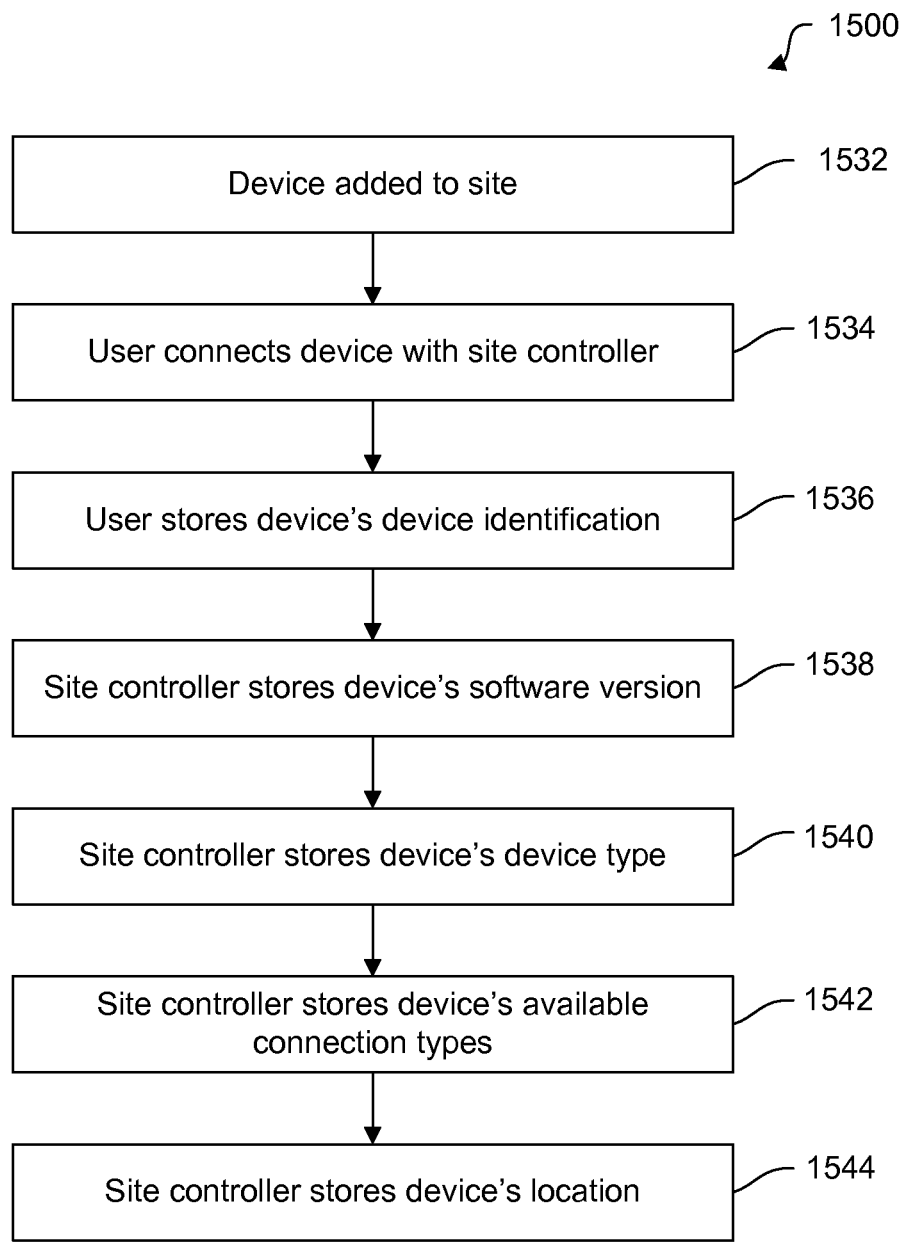
FIG. 15 is a flow diagram of an embodiment of a method for registering site devices at a site.

FIG. 15 is a flow diagram of an embodiment of a method 1500 for registering site devices 104 at a site 101. A site device 104 may be added 1532 to the site 101. For example, a switch/dimmer 933 may be installed in a home or a thermostat may be installed in an office building. In another example, a site remote control 724 or LCD keypad 937 may be installed in a home or office. For site devices 104 that are capable of communication over an Ethernet connection 826, adding 1532 a device to a site 101 may include connecting the device over an Ethernet connection 826. The user may connect 1534 the device with the site controller 103. Connecting 1534 the device with the site controller 103 may include turning on the device to enable wired or wireless communication with the site controller 103.

The user may store 1536 a device identification for the site device 104 on the site controller 103 by accessing the site controller 103. For example, the device identification may be stored in a site database on the site controller 103. The site controller 103 may store 1538 the device functionality of the site device 104. For example, the device functionality may be stored in the device database on the site controller 103. The site controller 103 may store 1540 a device type for the site device 104 on the site controller 103 (e.g., in the device database on the site controller 103). The site controller 103 may store 1542 the connection types available for the site device 104 on the site controller 103. For example, if the site device 104 is capable only of an Ethernet connection 826 and a ZigBee connection 828, this may be stored 1542 on the site controller 103. The site controller 103 may store 1544 the location of the site device 104. For example, the device location may indicate if the site device 104 is located in the living room 942, dining room 943, kitchen 944, den 945, or on the patio 946, etc. The device identification, device type, available connection types (i.e., an Ethernet connection 826, a WiFi connection 827, a ZigBee connection 828, or other connection types), and device location may be stored 1536, 1538, 1540, 1542, 1544 in the device database on the site controller 103.

In another embodiment, the site controller 103 may determine and store the device identification, device type, device functionality, available connection types, or device location without user input. For example, the site controller 103 may attempt to determine the available connection types by pinging the site device 104, the device location by comparing the device's response time to requests, the device type or device functionality by attempting to perform functions typically performed by the various device types, etc.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing remote assistance for controlling a site, comprising:
   receiving, at a site controller located in a same building as a control device, an infrared command indicating a remote assistance request from the control device, wherein the control device comprises a handheld remote control, wherein the site controller does not require a keyboard or a mouse for standard operation, and wherein the site controller is in electronic communication with a television;
   sending, from the site controller, the remote assistance request received from the control device to a remote server;
   receiving, at the site controller, a connection request from the remote server to connect with the control device;
   establishing, through the site controller, communication between the remote server and the control device, wherein the control device receives assistance from the remote server through the site controller based on the communication;
   using a user interface at the site comprising a video frame and an image frame displayed on the television, wherein the video frame displays a video image of an operator at a same time that the image frame displays a still image comprising a depiction of the handheld remote control, wherein the image frame displays the depiction of the handheld remote control with a highlighted button while the video frame displays the operator instructing a user to press the highlighted button;

receiving, at the site controller, an unprocessed command from the control device to control a site device; and determining whether the unprocessed command is correct, wherein the unprocessed command is correct when the unprocessed command is the same as a command sent from the remote server;

processing the unprocessed command when the unprocessed command is correct; and using the user interface at the site to instruct a user to press the highlighted button when the unprocessed command is incorrect.

2. The method of claim 1, further comprising determining capabilities of the site.

3. The method of claim 1, further comprising sending information in response to the remote assistance request.

4. The method of claim 3, wherein the information comprises video.

5. The method of claim 3, wherein the information comprises audio.

6. The method of claim 3, wherein the information comprises textual information.

7. The method of claim 1, further comprising determining whether the remote server should remotely control the site.

8. The method of claim 1, further comprising remotely controlling the site.

9. The method of claim 8, further comprising relinquishing remote control of the site.

10. The method of claim 1, further comprising reading configuration data from the site.

11. The method of claim 1, further comprising reading configuration data about the site from a database.

12. The method of claim 11, wherein the configuration data comprises device information relating to a plurality of devices.

13. The method of claim 1, further comprising sending prior support history information from the control device to the remote server.

14. The method of claim 1, further comprising:
receiving, at the site controller, command instructions from the remote server; and
receiving, at the site controller, the unprocessed command for controlling the site device based on the command instructions.

15. The method of claim 1, further comprising receiving a second remote assistance request from a second control device via a ZigBee connection.

16. A system that is configured for providing remote assistance for controlling a site, the system comprising:
a control device comprising a handheld remote control, wherein the control device is in electronic communication with a site controller, wherein the site controller does not require a keyboard or a mouse for standard operation, and wherein the site controller is in electronic communication with a television;
the site controller located in a same building as the control device, comprising:
a processor;
memory in electronic communication with the processor;
instructions stored in the memory, the instructions being executable to:
receive an infrared command indicating a remote assistance request from the control device;
send the remote assistance request received from the control device to a remote server;
receive a connection request from the remote server to connect with the control device;
establish, through the site controller, communication between the remote server and the control device, wherein the control device receives assistance from the remote server through the site controller based on the communication;
use a user interface displayed on the television at the site comprising a video frame and an image frame, wherein the video frame displays a video image of an operator at a same time that the image frame displays a still image comprising a depiction of the handheld remote control, wherein the image frame displays the depiction of the handheld remote control with a highlighted button while the video frame displays the operator instructing a user to press the highlighted button;
receive, at the site controller, an unprocessed command from the control device to control a site device; and
determine whether the unprocessed command is correct, wherein the unprocessed command is correct when the unprocessed command is the same as a command sent from the remote server;
process the unprocessed command when the unprocessed command is correct; and
use the user interface at the site to instruct a user to press the highlighted button when the unprocessed command is incorrect.

17. The system of claim 16, wherein the instructions are further executable to determine capabilities of the site.

18. The system of claim 16, further comprising a communication device in electronic communication with the site controller and wherein the instructions are further executable to establish communication between the communication device and the remote server.

19. The system of claim 16, wherein the instructions are further executable to determine whether the remote server should remotely control the site.

20. The system of claim 16, wherein the instructions are further executable to relay commands from the remote server to the site.

21. The system of claim 20, wherein the commands are relayed to an electronic device to cause a change on the electronic device.

22. The system of claim 16, wherein the site controller comprises an embedded system that includes built-in audio ports, built-in video ports, and built-in infrared in and out ports and wherein the site controller does not require an external exclusive computer monitor for standard operation.

23. The system of claim 16, wherein the control device controls the site device, and wherein the site device is a remote controller.

24. A non-transitory computer-readable medium comprising executable instructions for implementing a method for providing remote assistance for controlling a site that includes a site controller and a control device, wherein the control device is in electronic communication with the site controller, wherein the site controller is in electronic communication with a remote server, and wherein the instructions are executable to:
receive, at the site controller located in a same building as the control device, an infrared command indicating a remote assistance request from the control device, wherein the control device comprises a handheld remote control;
send the remote assistance request received from the control device to the remote server;
receive a connection request from the remote server to connect with the control device;

establish, through the site controller, communication between the remote server and the control device, wherein the control device receives assistance from the remote server through the site controller based on the communication, wherein the site controller does not require a keyboard or a mouse for standard operation, and wherein the site controller is in electronic communication with a television;

use a user interface at the site comprising a video frame and an image frame displayed on the television, wherein the video frame displays a video image of an operator at a same time that the image frame displays a still image comprising a depiction of the handheld remote control, wherein the image frame displays the depiction of the handheld remote control with a highlighted button while the video frame displays the operator instructing a user to press the highlighted button;

receive, at the site controller, an unprocessed command from the control device to control a site device; and determine whether the unprocessed command is correct, wherein the unprocessed command is correct when the unprocessed command is the same as a command sent from the remote server;

process the unprocessed command when the unprocessed command is correct; and use the user interface at the site to instruct a user to press the highlighted button when the unprocessed command is incorrect.

* * * * *